TROUSERS PRESS

Original Filed Oct. 17, 1968 3 Sheets-Sheet 1

TROUSERS PRESS

Original Filed Oct. 17, 1968 3 Sheets-Sheet 3

United States Patent Office

Re. 27,368
Reissued May 16, 1972

27,368

TROUSERS PRESS

Peter John Siddons Corby, Windsor, England, assignor to Rondel Limited, Hamilton, Bermuda Original No. 3,477,154, dated Nov. 11, 1969, Ser. No. 768,450, Oct. 17, 1968. Application for reissue Feb. 19, 1971, Ser. No. 117,169
Int. Cl. A47j *51/00*
U.S. Cl. 38—71 5 Claims

Matter enclosed in heavy brackets [ ] appears in the original patent but forms no part of this reissue specification; matter printed in italics indicates the additions made by reissue.

ABSTRACT OF THE DISCLOSURE

A trousers press has two flat members between which trousers are pressed. Each of two stretcher bars is movably mounted on a respective one of the two flat members, for gripping the upper part of the trousers between the stretcher bars during closing of the press and while the press is closed.

BACKGROUND OF THE INVENTION

Field of the invention

This invention relates to a trousers press using electricity for heating. Such a press is disclosed in British Patent No. 928,293.

Description of the prior art

It is known in a trousers press to provide for gripping and stretching the trousers before they are pressed. Thus, in the initial stages of closing the press, the cuffs at the lower end of the trousers are first gripped by a cuff board, which comprises a separately relatively movable part of one of the two surfaces of the press. Also the upper end of the trousers is engaged by a movable stretcher board and with continued closing movement of the press the strecher board causes the upper end of the trousers to be gripped between itself and one of the two surfaces of the press. The stretcher then moves and causes the trousers, gripped at each end, to be stretched. Finally the press closes on the stretched trousers and heat is applied to them, so that the combined effect of stretching, pressing, and heating should cause the trousers to be pressed and neatly creased.

It has been found that, in the initial stage of closing the press, when the pair of trousers is gripped at top and bottom and stretched, and before the press is fully closed, differential stretching has occurred; that is, one leg of the trousers has been stretched more than the other; the result has been uneven pressing and creasing.

It is an object of this invention to avoid this disadvantage of the known trousers press. It is another object of this invention to provide a trousers press that is cheaper to make than the known trousers press.

According to this invention, a trousers press comprises two flat members having facing surfaces between which trousers are pressed, characterized by the provision of a pair of stretcher bars for gripping between them the upper part on the trousers, each stretcher bar being movably mounted on a respective one of the two flat members. The stretcher bars are movably mounted on the bars so that, during closing of the press, each bar engages a respective side of the trousers and is moved a distance equal to the distance of movement of the other until the press is fully closed, such movements of the stretcher bars including a component in a direction such that the trousers are stretched during closing. Since the stretcher bars move equal distances, the stretching effect on the two sides of the trousers is equal, as compared with the known arrangement in which there is only a movable stretcher board which acts only on one side of the trousers, giving rise in effect to differential stretching.

BRIEF DESCRIPTION OF THE DRAWINGS

An embodiment of the invention will now be described by way of example, with reference to the accompanying drawings, in which.

DESCRIPTION OF THE PREFERRED EMBODIMENT

Figure 1:
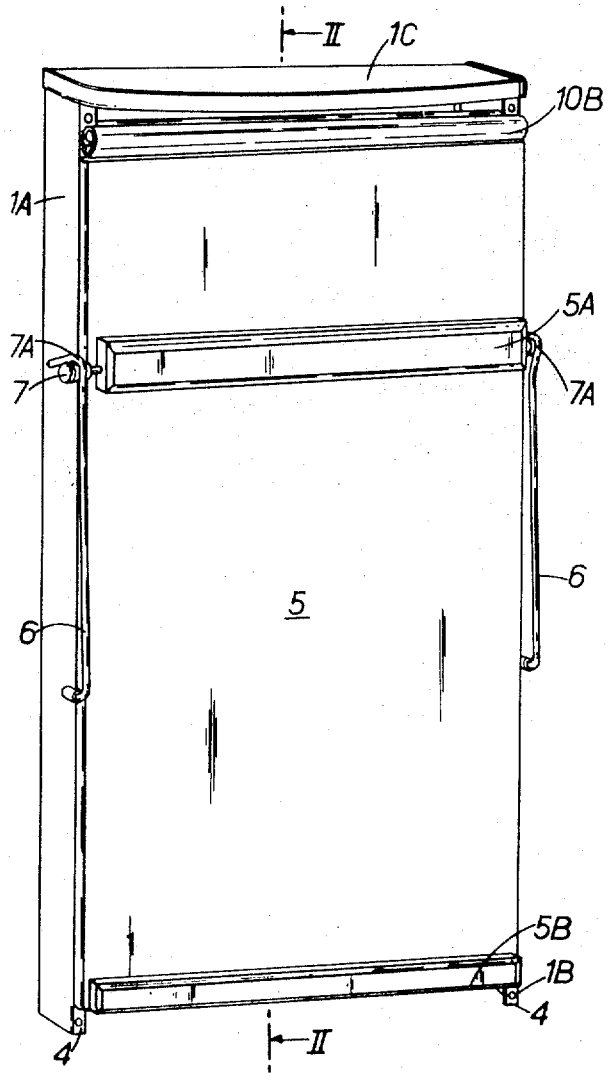
FIG. 1 is a perspective view of a trousers press in accordance with the invention.

Referring to the drawings, a trousers press has two metal side frame members 1A and 1B of channel section, which are connected at the top by a cross-member 1C. Fixed to and extending between the members 1A and 1B is a first rigid, flat, wooden member 2A on one face of which is held a resilient sheet 2B of foamed polyurethane plastics material, on which in turn is held a flexible sheet 2C of rubber in which are embedded electric wire heating elements (not shown). These heating elements preferably extend vertically.

Figure 7:
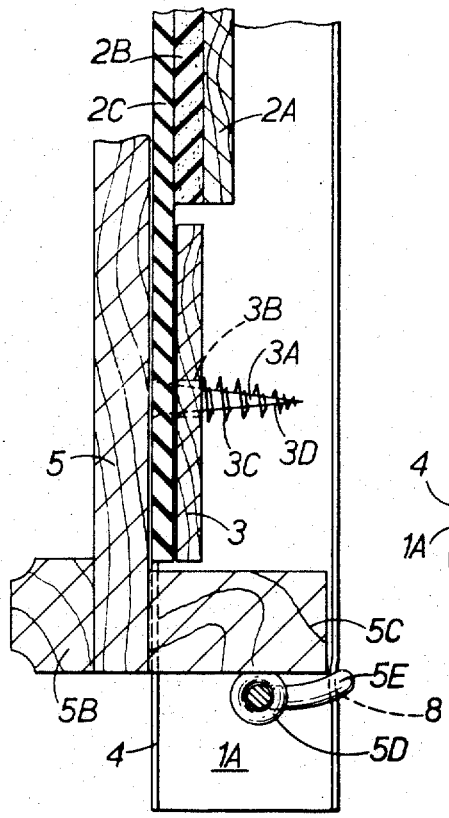
FIG. 7 is an enlarged detail cross section of part of FIG. 2, showing mounting of the cuff board.

A wooden cuff board 3 (FIGS. 2 and 7) is mounted on two screws 3A each fixed to, and extending rearwardly from the front flange 4 of a respective side member 1A, 1B. A hole 3B permits each cuff board to move rearwardly on its screw 3A against a compression spring 3C which is fixed at the region 3D to the respective screw 3A. In this manner the cuff board is movable rearwardly to accommodate, and at the same time grip the trousers cuffs (if any) when the press is closed. It will be seen that the flexible rubber sheet 2C extends over (but is not fixed to) the cuff board, whereas the resilient sheet 2B does not.

A second rigid, flat, wooden member 5 has two transverse reinforcing bars 5A, 5B and a rearwardly extending hinge bar 5C at its lower end. Projecting downwardly from the hinge bar 5C is a hinge eye 5D, and extending through this eye 5D is a spring steel hinge bar 5E. The flat member 5 is hingedly connected by this arrangement to the side frame members 1A, 1B (as will be explained), so that it can be moved between the FIGS. 2 and 3 positions. Each of a pair of clamping and retaining arms 6 form part of a unitary structure, being connected by an integral cross-member 6B (FIG. 6) which extends through horizontal slots 6C, one in each side frame member. The arms 6 run over rollers 7 and have elbow portions 7A for clamping the press shut, in known manner.

Figure 8:
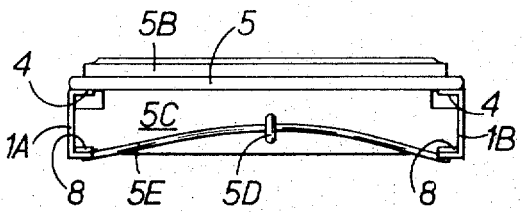
FIG. 8 is a bottom plan, with parts omittted.

The flat member 5 is hinged to the side frame members 1A, 1B in that the spring steel hinge bar 5E is bowed under tension (see FIG. 8) between the eye 5D and the frame members. Each end of the bar 5E is seated in a groove or depression 8 in a respective frame member, so that the effect is that the eye 5D is constantly drawn rearwardly (i.e. downwardly as viewed in FIG. 8 and to the right as viewed in FIG. 7). The lower end of the flat member 5 is thus also constantly drawn rearwardly, the ye 5D and bar 5E constituting a hinge connection. The pper part of the flat member 5 is drawn rearwardly in nown manner by the clamping action of the arms 6. Vhen the press is open (FIG. 3) the upper part of the at member 5 is retained by the ends 7B of the arms.

Figure 6:
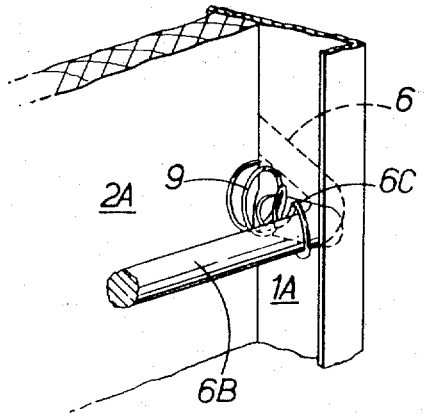
FIG. 6 is an enlarged detail perspective view of part of the back of the press.

When the press is closed (see FIGS. 2 and 6) the first r rear flat member 2A is pressed towards the second or ront flat member 5, so that the front face of the flexible ubber mat and the rear face of the member 5 engage and ress the trousers by two strong compression coil springs each acting between cross-member 6B and flat member A, as is shown particularly in FIG. 6.

Figure 3:
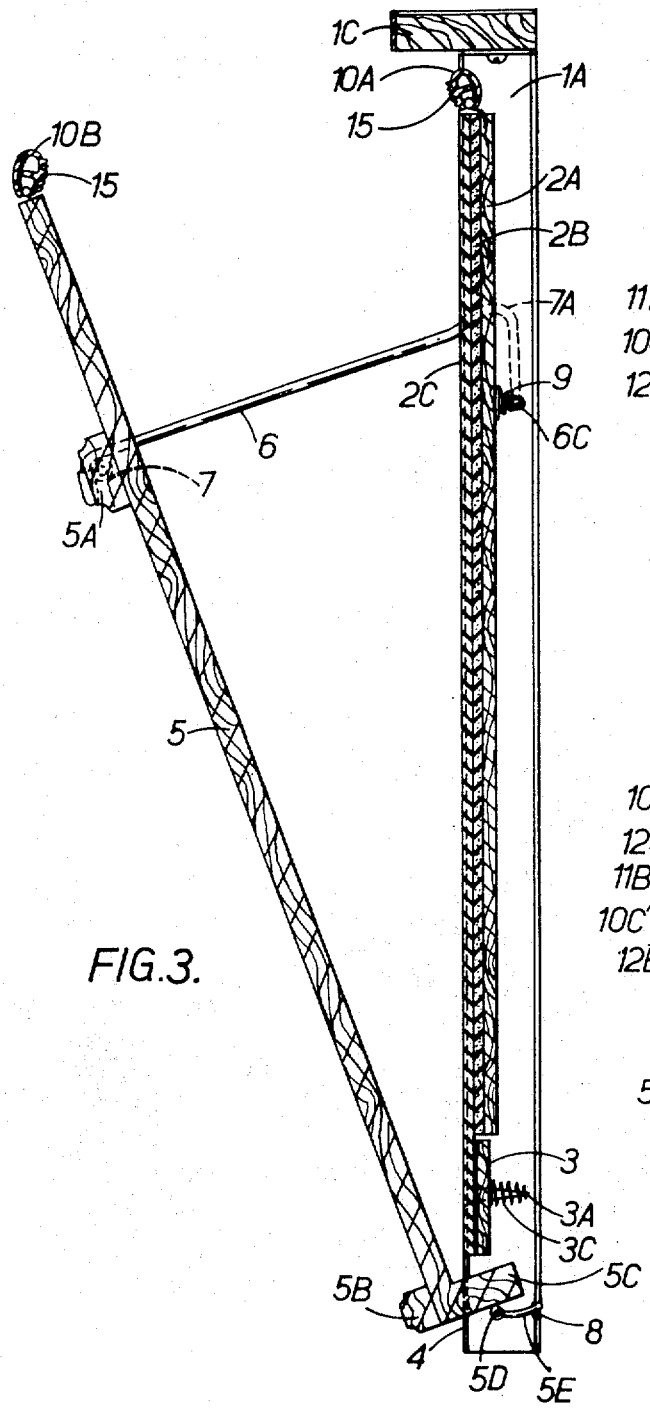
FIG. 3 is similar to FIG. 2, but showing the press open.
Figure 4:
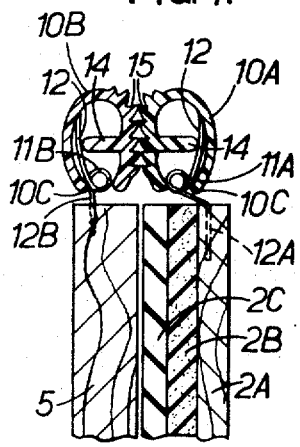
FIG. 4 is an enlarged detail cross section of the pair of stretcher bars shown in FIG. 2.
Figure 5:
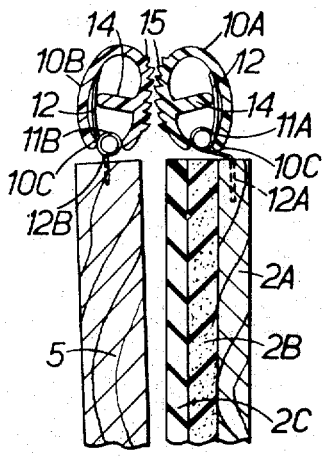
FIG. 5 is similar to FIG. 4 but showing the stretcher bars in their positions as they engage and grip a pair of trousers.

Referring now to FIGS. 4 and 5, a pair of stretcher ars 10A, 10B are respectively mounted on the upper ends f wooden flat members 2A and 5 by means of coil springs 1A and 11B. Each stretcher bar has at least two such prings, spaced apart along the length of the bar. Each pring has its upper leg 12 gripped within the hollow pro- le of the respective stretcher bar by a web 14. The lower g 12A, 12B of each spring extends down into the re- pective member 2A, 5, the leg 12A being bent as shown. he coil springs 11A, 11B, are received between the lower dges 10C of the stretcher bars, and bias the bars towards e inner position shown in FIG. 3. In the closed (FIG. ) position the bars press against each other against the orce of the springs: in the FIG. 5 position the bars touch, or gripping the upper part of the trousers, ready for tretching.

The stretcher bars are preferably of a polystyrene and re slightly flexible to permit some degree of bowing so s to accommodate for the increased thickness of the ousers seams.

The inner face of each stretcher bar has, in cross- ection, a series of somewhat upwardly directed teeth 15 or gripping the trousers.

In using the press, a pair of trousers is placed in the ress in the FIG. 3 position. The front member 5 is then ushed back, with the arms 6 riding over rollers 7. When e front member reaches the FIG. 5 position, the stretch- r bars, through their teeth 15 (which *are formed in the enerally convexly curved profiles of the inner faces 10D f the stretcher bars and* extend the full length of each tretcher bar in the form of ribs having the profile shown FIGS. 4 and 5) engage and grip the upper part of the ousers; the lower end or cuffs of the trousers are already t this stage gripped between the lower end of member 5 nd the rubber mat 2C over the cuff board 3, with the atter pushed back against the springs 3C.

On further closing of the press from the FIG. 5 toward e FIG. 4 position, the teeth 15 not only come closer ogether, but also—by virtue of the generally *convexly* urved profile of the inner face *10D* of each stretcher bar nd by virtue of the location of that face in relation to e springs 11A or 11B which constitute an approximate ivotal axis for the stretcher bar—move upwards. It may e said therefore that in moving from the FIG. 5 position the FIG. 4 position the *inner faces 10D and the* teeth 5 of the two stretcher bars execute as it were an upward olling movement. And by this movement the trousers, eld at the lower end by the cuff board, are stretched.

It will be seen from FIGS. 3, 4 and 5 that the stretcher ars are so mounted that they move in identical fashion, nd that the two sets of teeth 15 move substantially along bisecting plane between the inner face of member 5 nd the exposed face of the rubber heating sheet 2C. In this way an even stretching pull is applied to both sides of the trousers.

Figure 2:
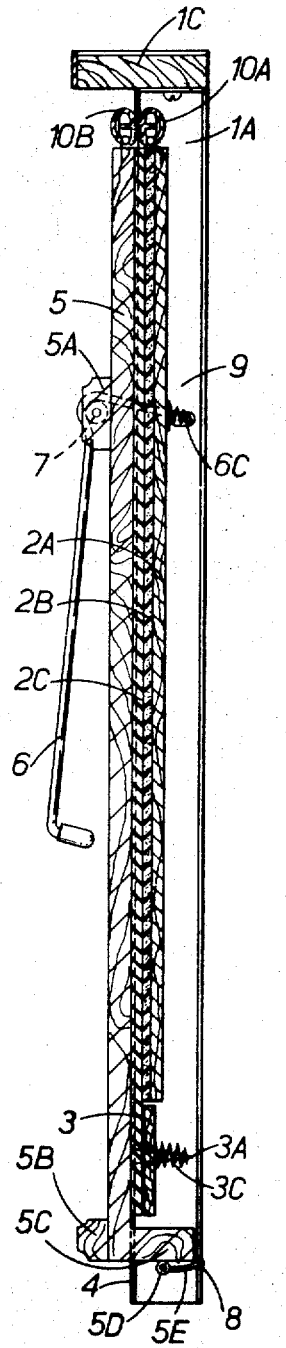
FIG. 2 is a section on plane II—II of FIG. 1, showing the press closed, but with the trousers omitted, for clarity.

When the press is closed in the position shown in FIGS. 1, 2 and 4, the member 5 is clamped and retained against the trousers and the rubber sheet 2C by the elbow portions 7A engaging over the rollers 7, in known manner.

The thickness and resilience of the sheet 2B is such as to permit the sheet 2C to flex to accommodate as necessary the various thicknesses of material of the trousers, particularly the zone of increased thickness where the seams extend longitudinally of the trousers.

The sheet 2B is heated, but no electrical connections or control means are shown, as these are well known.

Although it is preferred that the resilient sheet should be on the member 2A as described above, other arrangements are possible. For example the resilient sheet could be on the member 5, faced by a second flexible sheet, with the flexible heated sheet 2C directly on the member 2A.

I claim:

1. A trousers press comprising two flat members having facing surfaces between which trousers are pressed, characterized by the provision of a pair of stretcher bars [(10A, 10B)] for gripping between them the upper part of [the] *a pair of* trousers *inserted into the press, and means movably mounting* each stretcher bar [being movably mounted] on a respective one of the two flat members [(2A, 5)], *the inner face of each stretcher bar engaging the trousers being convexly curved, and the respective inner faces of said bars executing a rolling movement in the direction away from the flat members, stretching the trousers, when said flat members are moved towards one another.*

[2. A press according to claim 1 characterized in that the stretcher bars are movably mounted on the two flat members in such manner, during closing of the press, each engages a respective side of the trousers and is moved a distance equal to the distance of movement of the other until the press is fully closed, such movements of the stretcher bars including a component in a direction such that the trousers are stretched during closing.]

3. A press according to claim 1 characterized in that the stretcher bars are flexible so as to be capable of bowing.

4. A press according to claim 1 characterized in that the inner face of each stretcher bar is formed with a series of parallel ridges [(15)].

5. A press according to claim 4 characterized in that the ridges are of such shape that in a cross section of the bar they constitute a series of upwardly directed teeth [(15)].

6. A press according to claim 1 characterized in that each stretcher bar is mounted on a flat member by means of at least two coil springs [(12)] which urge the stretcher bars towards one another.

References Cited

The following references, cited by the Examiner, are of record in the patented file of this patent or the original patent.

UNITED STATES PATENTS

| | | | |
|---|---|---|---|
| 1,498,654 | 6/1924 | Hauptman | 38—71 |
| 3,145,490 | 8/1964 | Corby | 38—71 |

PATRICK D. LAWSON, Primary Examiner